(12) United States Patent
Murata et al.

(10) Patent No.: US 11,829,021 B2
(45) Date of Patent: Nov. 28, 2023

(54) POLYMER DISPERSED LIQUID CRYSTAL DISPLAY DEVICE COMPRISING A POLYMER NETWORK HAVING A HELICAL STRUCTURE AND METHOD FOR MANUFACTURING THE SAME

(71) Applicant: Sharp Display Technology Corporation, Kameyama (JP)

(72) Inventors: Koji Murata, Kameyama (JP);
Kimiaki Nakamura, Kameyama (JP);
Mariko Honda, Kameyama (JP);
Tadashi Hasegawa, Kameyama (JP);
Kazutaka Hanaoka, Kameyama (JP);
Yasuhiro Haseba, Kameyama (JP);
Shinji Shimada, Kameyama (JP);
Atsuko Kanashima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 72 days.

(21) Appl. No.: 17/579,388

(22) Filed: Jan. 19, 2022

(65) Prior Publication Data

US 2022/0236598 A1    Jul. 28, 2022

(30) Foreign Application Priority Data

Jan. 28, 2021    (JP) ................ 2021-012201

(51) Int. Cl.
*G02F 1/1334*    (2006.01)
*G02F 1/1341*    (2006.01)
*G02F 1/1337*    (2006.01)

(52) U.S. Cl.
CPC ........ *G02F 1/13347* (2021.01); *G02F 1/1341* (2013.01); *G02F 1/13345* (2021.01); *G02F 1/133738* (2021.01); *G02F 1/133788* (2013.01)

(58) Field of Classification Search
CPC ............ G02F 1/13347; G02F 1/13345; G02F 1/133738
See application file for complete search history.

(56) References Cited

U.S. PATENT DOCUMENTS

2014/0313468 A1*  10/2014  Fujisawa ............... G02F 1/1416
349/168
2019/0302523 A1*  10/2019  Okuyama ............. G02F 1/1347

FOREIGN PATENT DOCUMENTS

CN          107272277 A  * 10/2017 ............... E06B 9/24
CN          107300789 A  * 10/2017 ............. G02F 1/132
(Continued)

OTHER PUBLICATIONS

Rumiko Yamaguchi and Shintaro Sakurai, "Cell Thickness Dependence on Electric Optical Property of Reverse Mode Liquid Crystal Display", J. Photopolym. Sci. Technol., vol. 27, No. 3, 287-290 (Sep. 2014).

*Primary Examiner* — Paul C Lee
(74) *Attorney, Agent, or Firm* — ScienBiziP, P.C.

(57) ABSTRACT

Provided is a polymer dispersed liquid crystal display device including: a pair of substrates including an electrode on at least one substrate; and a composite layer disposed between the pair of substrates. The composite layer includes a liquid crystal component and a polymer network constituted by a cured product of a photopolymerizable liquid crystal compound, and is in a transparent state when no voltage is applied and in a scattering state when a voltage is applied, and the polymer network has a helical structure with a number of turns of from one to less than eight in the composite layer.

12 Claims, 7 Drawing Sheets

(56) References Cited

FOREIGN PATENT DOCUMENTS

| | | | | |
|---|---|---|---|---|
| EP | 0819971 A2 * | 1/1998 | ......... | G02F 1/13718 |
| JP | H11-095195 A | 4/1999 | | |
| JP | 2016-184031 A | 10/2016 | | |

* cited by examiner

POLYMER DISPERSED LIQUID CRYSTAL DISPLAY DEVICE COMPRISING A POLYMER NETWORK HAVING A HELICAL STRUCTURE AND METHOD FOR MANUFACTURING THE SAME

CROSS-REFERENCE TO RELATED APPLICATIONS

This application claims the benefit of priority to Japanese Patent Application Number 2021-012201 filed on Jan. 28, 2021. The entire contents of the above-identified application are hereby incorporated by reference.

BACKGROUND

Technical Field

The disclosure pertains to a polymer dispersed liquid crystal display device and a method for manufacturing the same. More specifically, the disclosure pertains to a reverse-type polymer dispersed liquid crystal display device that is in a transparent state when no voltage is applied and is in a scattering state when a voltage is applied, and to a method for manufacturing the same.

A liquid crystal display device is a display device in which a liquid crystal composition is used for display. In a typical display system of a liquid crystal display device, the transmission amount of light is controlled by applying a voltage to a liquid crystal composition enclosed between a pair of substrates to change the alignment state of liquid crystal molecules in the liquid crystal composition according to the applied voltage. Such liquid crystal display devices make use of merits such as a thin, lightweight design and low power consumption, and thus are used in a wide range of fields.

In recent years, a liquid crystal display device (hereinafter, also referred to as a polymer dispersed liquid crystal display device) in which a polymer dispersed liquid crystal (PDLC) is used without requiring a polarizer has been developed. With a PDLC, the liquid crystal component is dispersed in a polymer network, and by changing the alignment state of the liquid crystal component through the application of a voltage, the difference in refractive indexes between the liquid crystal component and the polymer network can be used to switch between a transparent state and a scattering state.

Polymer dispersed liquid crystal display devices include a normal type (normal mode) in which a change from the scattering state to the transparent state occurs when a voltage is applied, and a reverse-type (reverse-mode) in which a change from the transparent state to the scattering state occurs when a voltage is applied.

As technologies pertaining to polymer dispersed liquid crystal display devices, JP 2016-184031 A, for example, discloses a liquid crystal alignment film that is used in a reverse-mode polymer dispersed liquid crystal display element that changes from a transparent state to a scattering state when a voltage is applied, the liquid crystal alignment film being obtained by homeotropic alignment of a UV-curable liquid crystal on a transparent film substrate.

In addition, JP 11-95195 A discloses a polymer dispersed liquid crystal display device in which liquid crystals and UV-curable liquid crystals are in a liquid crystal phase in a miscible state, and when the liquid crystals and the UV-curable liquid crystals are cured and phase separated by ultraviolet light, a liquid crystal-cured polymer composite phase is formed, the liquid crystal-cured polymer composite phase is sandwiched between two substrates, each equipped with an alignment film, a transparent electrode is provided on an inner surface of at least one of the substrates, and the polymer dispersed liquid crystal display device is in a light scattering state when an electrical field is applied, and when an electrical field is not applied, the liquid crystals align in parallel in the same direction or are aligned in a twisted manner, wherein in the liquid crystal-cured polymer composite layer, the liquid crystal layer is continuous, and the polymer layer is formed as a three-dimensionally continuous fibrous matrix in which a birefringent cured-polymer layer exhibits birefringence.

J. Photopolym. Sci. Technol., Vol. 27, No. 3, 287-290 (2014) discloses a polymer dispersed liquid crystal display device in which a chiral agent is added to a liquid crystal layer, and a positive liquid crystal material is used.

SUMMARY

In a typical reverse-type polymer dispersed liquid crystal display device, the liquid crystal component is planar aligned (horizontal alignment), and when no voltage is applied, the refractive indexes of the liquid crystal component and the polymer network match, and therefore the reverse-type polymer dispersed liquid crystal display device achieves a transparent state. Further, when a voltage is applied, the refractive indexes of the liquid crystal component and the polymer network do not match, and therefore the reverse-type polymer dispersed liquid crystal display device achieves a scattering state. However, of the two types of polarized light that are perpendicularly incident on the polymer dispersed liquid crystal display device, one type of polarized light does not sense a difference in refractive indexes between the liquid crystal component and the polymer network and does not contribute to scattering, and only the other type of polarized light contributes to scattering, and therefore scattering is not sufficiently obtained when a voltage is applied. In addition, when no voltage is applied, the liquid crystal component and the polymer network are fully aligned horizontally (tilt angle of 0°), and this results in a problem of the drive voltage being large (for example, a drive voltage greater than 10 V).

With the homeotropic aligned reverse-mode polymer dispersed liquid crystal display element disclosed in JP 2016-184031 A, a negative liquid crystal is used, and a drive voltage of several tens of volts or higher is required to achieve sufficient scattering, and therefore sufficient scattering cannot be achieved while suppressing the drive voltage (for example, a drive voltage of 10 V or less).

The polymer dispersed liquid crystal display device disclosed in JP 11-95195 A has a thin cell thickness of 5 μm, and it is difficult to achieve a transmittance of 10% or less when a voltage is applied, and thus it is thought that sufficient scattering cannot be obtained.

In J. Photopolym. Sci. Technol., Vol. 27, No. 3, 287-290 (2014), a small value of transmittance at a drive voltage of 10 V or less is approximately 40%, which is high, and sufficient scattering at a drive voltage of 10 V or less is not obtained.

The disclosure was developed in light of the current conditions described above, and an object of the disclosure is to provide a polymer dispersed liquid crystal display device that can achieve sufficient scattering while suppressing the drive voltage, and to provide a method for manufacturing the polymer dispersed liquid crystal display device.

(1) An embodiment of the disclosure is a polymer dispersed liquid crystal display device including: a pair of substrates including an electrode on at least one substrate; and a composite layer disposed between the pair of substrates; wherein the composite layer includes a liquid crystal component and a polymer network constituted by a cured product of a photopolymerizable liquid crystal compound, and is in a transparent state when no voltage is applied and in a scattering state when a voltage is applied; and the polymer network has a helical structure with a number of turns of from one to less than eight in the composite layer.

(2) Additionally, an embodiment of the disclosure is a polymer dispersed liquid crystal display device wherein, in addition to the configuration of (1) above, the thickness of the composite layer and the twisting pitch of the polymer network satisfy the following relational expression 1.

$$d \geq p \quad \text{(Relational Expression 1)}$$

wherein, d represents the thickness of the composite layer, and p represents the twisting pitch of the polymer network.

(3) Additionally, an embodiment of the disclosure is a polymer dispersed liquid crystal display device wherein, in addition to the configuration of (2) above, the thickness of the composite layer and the twisting pitch of the polymer network satisfy the following relational expression 2.

$$d \geq 2p \quad \text{(Relational Expression 2)}$$

wherein, d represents the thickness of the composite layer, and p represents the twisting pitch of the polymer network.

(4) Additionally, an embodiment of the disclosure is a polymer dispersed liquid crystal display device wherein, in addition to the configuration of (3) above, the thickness of the composite layer and the twisting pitch of the polymer network satisfy the following relational expression 3.

$$d \geq 4p \quad \text{(Relational Expression 3)}$$

wherein, d represents the thickness of the composite layer, and p represents the twisting pitch of the polymer network.

(5) Additionally, an embodiment of the disclosure is a polymer dispersed liquid crystal display device wherein, in addition to the configuration of (1), (2), (3), or (4) above, a refractive index anisotropy Δn of the liquid crystal component is from 0.18 to 0.24.

(6) Additionally, an embodiment of the disclosure is a polymer dispersed liquid crystal display device wherein, in addition to the configuration of (1), (2), (3), (4), or (5), a weight ratio of the liquid crystal component to the polymer network is from 90:10 to 97:3.

(7) Additionally, an embodiment of the disclosure is a polymer dispersed liquid crystal display device, further including, in addition to the configuration of (1), (2), (3), (4), (5), or (6) above, an alignment film between at least one substrate of the pair of substrates and the composite layer, wherein the alignment film is a horizontal alignment film configured to align the liquid crystal component in parallel to a surface of the alignment film.

(8) Additionally, an embodiment of the disclosure is a method for manufacturing a polymer dispersed liquid crystal display device of the above-described configuration of (1), (2), (3), (4), (5), (6), or (7), the manufacturing method including: an alignment film forming step of forming an alignment film subjected to an alignment treatment on one surface of each of the pair of substrates; an injection step of disposing the substrates of the pair of substrates facing each other with the alignment films oriented inward, and injecting a composition containing the liquid crystal component, the photopolymerizable liquid crystal compound, a polymerization initiator, and a chiral agent between the pair of substrates; and a light irradiation step of irradiating the composition with light to thereby form the polymer network while the photopolymerizable liquid crystal compound is cured.

(9) Additionally, an embodiment of the disclosure is a method for manufacturing a polymer dispersed liquid crystal display device, wherein, in addition to the configuration of (8) above, in the light irradiation step, the composition is irradiated with light having an illuminance from 5 mW/cm$^2$ to 50 mW/cm$^2$.

(10) Additionally, an embodiment of the disclosure is a method for manufacturing a polymer dispersed liquid crystal display device, wherein, in addition to the configuration of (8) or (9) above, in the light irradiation step, the composition is irradiated with light of an irradiation dose from 0.5 J/cm$^2$ to 5 J/cm$^2$.

(11) Additionally, an embodiment of the disclosure is a method for manufacturing a polymer dispersed liquid crystal display device, wherein, in addition to the configuration of (8), (9), or (10) above, a weight ratio of the liquid crystal component to the photopolymerizable liquid crystal compound in the composition is from 90:10 to 97:3.

(12) Additionally, an embodiment of the disclosure is a method for manufacturing a polymer dispersed liquid crystal display device, wherein, in addition to the configuration of (8), (9), (10), or (11), the alignment film is a horizontal alignment film configured to align the liquid crystal component in parallel to a surface of the alignment film.

According to the disclosure, a polymer dispersed liquid crystal display device that can achieve sufficient scattering while suppressing the drive voltage, and a method for manufacturing the same can be provided.

BRIEF DESCRIPTION OF DRAWINGS

The disclosure will be described with reference to the accompanying drawings, wherein like numbers reference like elements.

DESCRIPTION OF EMBODIMENTS

The disclosure will be described in detail below through the presentation of embodiments with reference to the drawings. However, the disclosure is not limited only to these embodiments.

Definitions of Terms

In the present specification, "observation surface side" refers to a side closer to a screen (display surface) of the polymer dispersed liquid crystal display device, and "back surface side" refers to a side farther from the screen (display surface) of the polymer dispersed liquid crystal display device.

Embodiments

Figure 1:
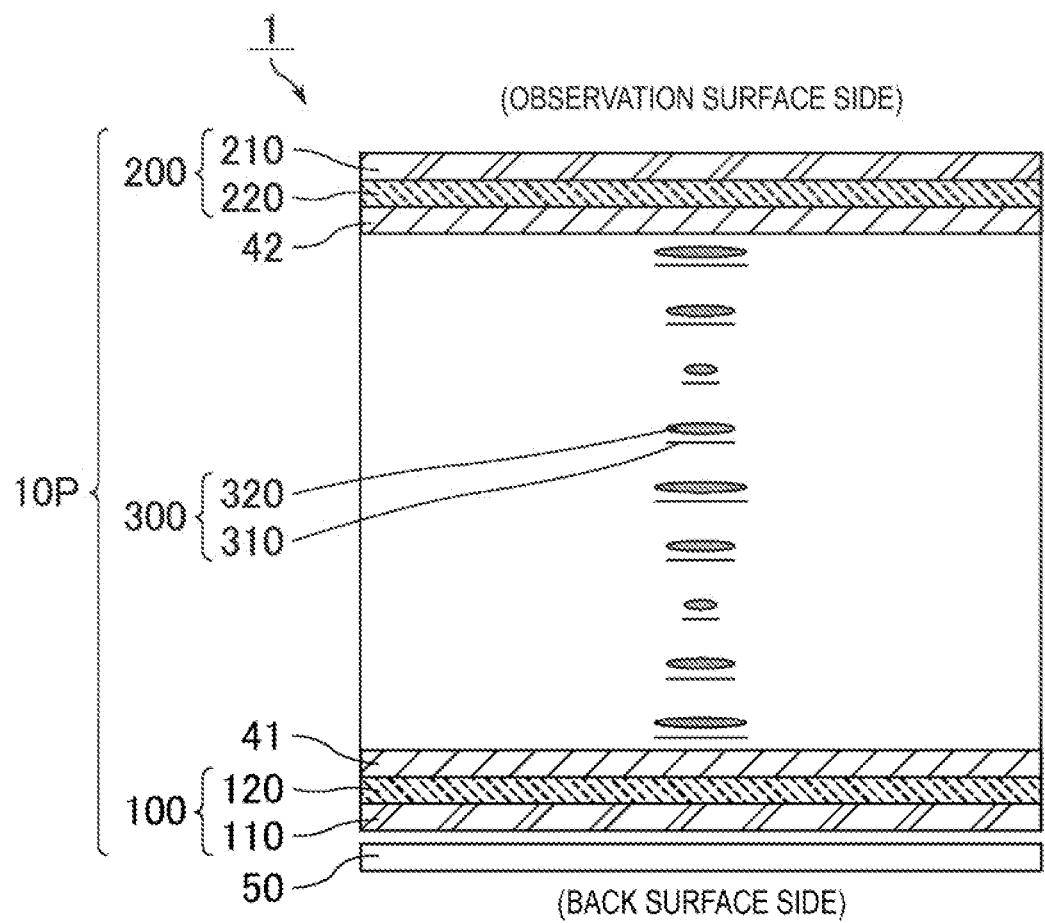
FIG. 1 is a schematic cross-sectional view of a polymer dispersed liquid crystal display device according to an embodiment.

FIG. 1 is a schematic cross-sectional view of a polymer dispersed liquid crystal display device according to an embodiment. As illustrated in FIG. 1, a polymer dispersed liquid crystal display device 1 according to the present embodiment includes, in order from the back surface side towards the observation surface side: a liquid crystal panel 10P including a thin film transistor (TFT) substrate 100 as one substrate of the abovementioned pair of substrates, a first alignment film 41, a composite layer 300, a second alignment film 42, and a counter substrate 200 as the other substrate of the pair of substrates; and a backlight 50 disposed on the back surface side of the liquid crystal panel 10P.

The TFT substrate 100 includes a support substrate 110 and a pixel electrode 120 in order from the back surface side toward the observation surface side. The counter substrate 200 includes a support substrate 210 and a common electrode 220 in order from the observation surface side toward the back surface side.

The composite layer 300 includes: a polymer network 310 constituted by a cured product of a photopolymerizable liquid crystal compound; and a liquid crystal component 320; and the composite layer 300 is in a transparent state when no voltage is applied and is in a scattering state when a voltage is applied. Through such an aspect, a display device that does not require a polarizer can be realized. More specifically, when no voltage is applied, the composite layer 300 is in a transparent state, and when a voltage is applied, the alignment of the liquid crystal component 320 changes, and the composite layer 300 enters into a scattering state.

Here, "when no voltage is applied" refers to a time when the voltage applied to the composite layer 300 is less than a threshold voltage (including no voltage application), and "when a voltage is applied" refers to a time when the voltage applied to the composite layer 300 is equal to or greater than the threshold voltage.

Also, the transparent state is a state having transparency to light. For example, the light transmittance of the composite layer 300 in the transparent state may be 80% or greater, or may be 90% or greater. Furthermore, the light transmittance of the composite layer 300 in the transparent state may be 100% or less. In the present embodiment, the composite layer 300 in the transparent state is transparent to visible light. The scattering state is a state in which light is scattered. For example, the light transmittance of the composite layer 300 in the scattering state may be 10% or less, or may be 8% or less. Furthermore, the light transmittance of the composite layer 300 in the scattering state may be 0% or greater. In addition, a haze indicating a light scattering ratio of the composite layer 300 in the scattering state varies depending on the applied voltage, but may be, for example, 80% or greater, or 90% or greater. Additionally, the haze indicating the light scattering ratio of the composite layer 300 in the scattering state may be 100% or less. In the present embodiment, the composite layer 300 in the scattering state scatters visible light. Therefore, the composite layer 300 in the scattering state is the same state as frosted glass.

The polymer network 310 has a helical structure with a number of turns of one or more in the composite layer 300. Through such an aspect, the amount (opportunity) at which light incident on the polymer dispersed liquid crystal display device 1 senses a difference in refractive indexes between the polymer network 310 and the liquid crystal component 320 can be increased with respect to the thickness direction of the composite layer 300, and therefore sufficient scattering can be obtained while suppressing the drive voltage. In addition, the polymer network 310 has a helical structure with a number of turns of less than eight in the composite layer 300. Here, when no voltage is applied, the polymer network 310 and the liquid crystal component 320 both wind in a helix, but it is thought that as the number of rotations increases, the contact surface area between the two increases, and thereby interaction becomes stronger. Therefore, when the polymer network 310 has a helical structure with a number of turns of eight or more in the composite layer 300, a strong electric field (=a high voltage) is required to ease the interaction between the polymer network 310 and the liquid crystal component 320 through voltage application and cause the liquid crystal molecules in the liquid crystal component 320 to vertically align, and the drive voltage when achieving the scattering state increases. In the present embodiment, the polymer network 310 has a helical structure with a number of turns of less than eight in the composite layer 300, and thereby sufficient scattering can be obtained while suppressing the drive voltage. Further, in the present embodiment, the polymer network 310 has a helical structure with a number of turns of from one to less than eight in the composite layer 300, and thereby, specifically for example, when a voltage is applied, a low transmittance of 10% or less can be achieved while suppressing the drive voltage to 10 V or less.

Each constituent element of the liquid crystal display device according to the present embodiment is described in further detail below.

The TFT substrate 100 is a substrate provided with a TFT, which is a switching element used to switch the pixels of the polymer dispersed liquid crystal display device 1 on and off. In the present embodiment, a configuration of the TFT substrate 100 for a TN mode will be described.

The TFT substrate 100 includes, in order from the back surface side toward the observation surface side, a support substrate 110, a plurality of gate lines extending in parallel to each other, a gate insulating film, a plurality of source lines extending in parallel to each other in a direction intersecting each gate line, an interlayer insulating film, and a pixel electrode 120. The plurality of gate lines and the plurality of source lines are collectively formed in a lattice pattern so as to partition each pixel. A TFT is disposed as a switching element at each intersection point between each gate line and each source line. A pixel electrode 120 is disposed in each region surrounded by two gate lines adjacent to each other and two source lines adjacent to each other.

Each TFT is a three-terminal switch that is connected to a corresponding gate line and a corresponding source line of the plurality of gate lines and plurality of source lines. The TFT has: a gate electrode protruded from the corresponding gate line (which is a portion of the gate line); a source electrode protruding from the corresponding source line (which is portion of the source line); a drain electrode connected to a corresponding pixel electrode of a plurality of pixel electrodes; and a thin film semiconductor. The source electrode and the drain electrode are electrodes provided on the same source wiring layer as the source line, and the gate electrode is an electrode provided on the same gate wiring layer as the gate line.

The thin film semiconductor layer of each TFT is configured by, for example, a high-resistance semiconductor layer made of amorphous silicon, polysilicon, or the like, and a low-resistance semiconductor layer made of n+ amorphous silicon obtained by doping amorphous silicon with an impurity such as phosphorus. An oxide semiconductor layer such as a zinc oxide layer may also be used as the thin film semiconductor layer.

The support substrates 110 and 210 are preferably transparent substrates, and examples thereof include glass substrates and plastic substrates.

The gate insulating film is, for example, an inorganic insulating film. Examples of the inorganic insulating film that can be used include inorganic films (relative dielectric constant ε=5 to 7) such as silicon nitride (SiNx) and silicon oxide ($SiO_2$), or a layered film thereof.

The gate wiring layer and the source wiring layer are, for example, a single layer or a plurality of layers of a metal such as copper, titanium, aluminum, molybdenum, and tungsten, or an alloy thereof. The various wirings and electrodes constituting the gate lines, source lines, and TFT can be formed by forming a metal such as copper, titanium, aluminum, molybdenum, or tungsten, or an alloy thereof into a film with a single layer or a plurality of layers through sputtering or the like, and then patterning the film using a method such as photolithography. When these various wirings and electrodes are formed in the same layer, manufacturing can be efficiently implemented by using the same material for the various wirings and electrodes.

The interlayer insulating film is, for example, an inorganic insulating film. Examples of the inorganic insulating film that can be used include inorganic films (relative dielectric constant ε=5 to 7) such as silicon nitride (SiNx) and silicon oxide ($SiO_2$), or a layered film thereof.

The pixel electrode 120 is an electrode arranged in a planar shape (solid form) in each region surrounded by two gate lines adjacent to each other and two source lines adjacent to each other. The pixel electrode 120 is electrically connected to a corresponding source line through the thin film semiconductor layer included in the TFT. The pixel electrode 120 is set to a potential according to a data signal supplied via a corresponding TFT.

The common electrode 220 is an electrode formed in approximately one plane regardless of the boundary of the pixel. A common signal held at a constant value is supplied to the common electrode 220, and the common electrode 220 is held at a constant potential.

Examples of the materials of the pixel electrode 120 and the common electrode 220 include indium tin oxide (ITO) and indium zinc oxide (IZO).

The composite layer 300 includes the polymer network 310 and the liquid crystal component 320 and is sandwiched between the TFT substrate 100 and the counter substrate 200. In the composite layer 300, a fibrous matrix of a cured product of the photopolymerizable liquid crystal compound is aggregated to form a three-dimensionally continuous polymer network 310, and the liquid crystal component 320 is in a phase-separated state in the polymer network 310.

The polymer network 310 has a helical structure and twists 360° per one turn of the helical structure. That is, one turn of the helical structure of the polymer network 310 corresponds to a 360° twist of the polymer network 310.

The polymer network 310 has a helical structure with a number of turns of from one to less than eight in the composite layer 300. That is, the polymer network 310 has an alignment structure that is twisted by at least 360° and less than 2880° in the composite layer 300. Through such an aspect, sufficient scattering can be obtained while suppressing the drive voltage.

The polymer network 310 preferably has a helical structure with a number of turns of from one to four in the composite layer 300. That is, the polymer network 310 preferably has an alignment structure that is twisted by at least 360° and 1440° or less in the composite layer 300. Through such an aspect, sufficient scattering can be obtained while further suppressing the drive voltage.

In the polymer dispersed liquid crystal display device 1, when no voltage is applied, the polymer network 310 and the liquid crystal component 320 have the same helical structure, and thus a transparent state can be achieved. In other words, the matter of the polymer network 310 having a helical structure with a number of turns of from one to less than eight in the composite layer 300 means that the liquid crystal component 320 has a helical structure with a number of turns of from one to less than eight in the composite layer 300 when no voltage is applied.

The liquid crystal component 320 has a helical structure with a number of turns of from one to less than eight in the composite layer 300 when no voltage is applied. In other words, when no voltage is applied, the liquid crystal component 320 has an alignment structure that is twisted by at least 360° and less than 2880° in the composite layer 300. Through such an aspect, sufficient scattering can be obtained while suppressing the drive voltage.

The liquid crystal component 320 preferably has a helical structure with a number of turns of from one to four in the composite layer 300 when no voltage is applied. In other words, when no voltage is applied, the liquid crystal component 320 preferably has an alignment structure that is twisted by at least 360° and 1440° or less in the composite layer 300. Through such an aspect, sufficient scattering can be obtained while further suppressing the drive voltage.

Figure 2:
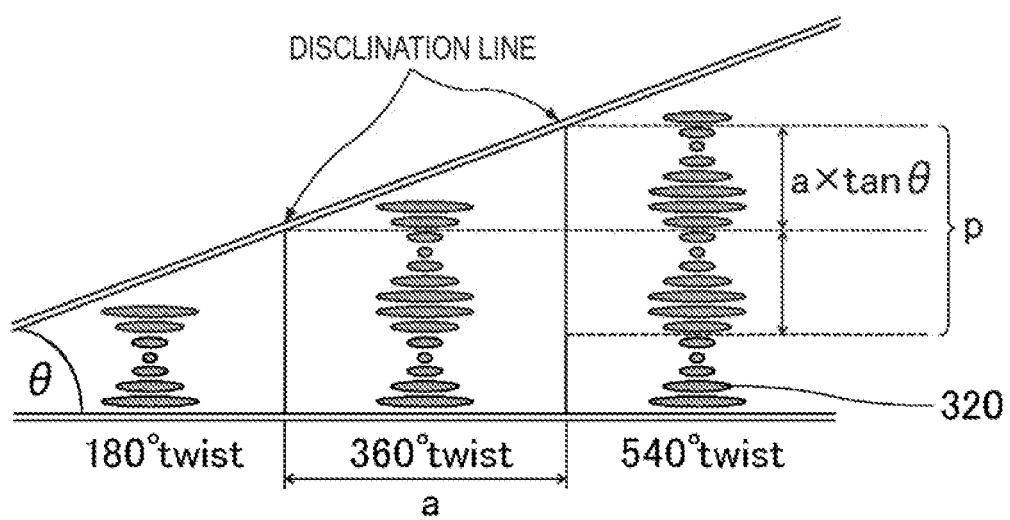
FIG. 2 is a diagram for describing a method for measuring a twisting pitch of a liquid crystal component in order to estimate a twisting pitch of a polymer network included in a polymer dispersed liquid crystal display device of an embodiment.

FIG. 2 is a diagram for describing a method for measuring a twisting pitch of a liquid crystal component in order to estimate a twisting pitch of a polymer network included in a polymer dispersed liquid crystal display device of an embodiment. If the polymer dispersed liquid crystal display device 1 is in a transparent state when no voltage is applied, the polymer network 310 will twist at the same pitch as the liquid crystal component 320. In other words, the twisting pitch of the polymer network 310 and the twisting pitch of the liquid crystal component 320 are the same when no voltage is applied, and therefore the twisting pitch of the polymer network 310 can be determined indirectly from the twisting pitch of the liquid crystal component 320. Thus, in the present embodiment, the polymer network 310 and the liquid crystal component 320 are assumed to have the same twisting pitch p, and a wedge-shaped cell illustrated in FIG. 2 that has been subjected to a horizontal alignment treatment is used to determine the twisting pitch p from the liquid crystal component 320 extracted by disassembling the polymer dispersed liquid crystal display device 1. The liquid crystal component 320 may or may not contain the abovementioned photopolymerizable liquid crystal compound. Here, the twisting pitch p is the thickness of the liquid crystal component 320 corresponding to a single turn (twisting of 360°) of the helical structure, and is also the thickness of the polymer network 310 corresponding to a single turn (twisting of 360°) of the helical structure.

When the liquid crystal component 320 is injected into the wedge-shaped cell illustrated in FIG. 2 and left standing for a long period of time, the alignment state illustrated in FIG. 2 is achieved. As the liquid crystal component 320 becomes thicker, the twisting increases by 180° at a time, and disclination (defect) lines are observed at the boundary. An interval a between disclinations is read using a polarization microscope, and the twisting pitch (pitch length) p can be calculated by the following equation P1. Note that the number of turns of the helical structure of the polymer network 310 in the composite layer 300 and the number of turns of the helical structure of the liquid crystal component 320 when no voltage is applied are determined by dividing the thickness of the composite layer 300 by the twisting pitch p. Furthermore, the twisting (twist angle) of the polymer network 310 in the composite layer 300 and the twisting (twist angle) of the liquid crystal component 320 in the composite layer 300 when no voltage is applied can be determined by multiplying the number of turns by 360°.

$$p = 2a \times \tan\theta \quad \text{(Equation P1)}$$

(In the above equation, p represents the twisting pitch of the polymer network, a represents the interval between disclinations, and θ represents the angle formed by the pair of substrates configuring the wedge-shaped cell.)

Note that p in the above equation P1 represents the twisting pitch of the polymer network 310, and as described above, also represents the twisting pitch of the liquid crystal component 320 when no voltage is applied.

The thickness of the composite layer 300 and the twisting pitch of the polymer network 310 preferably satisfy the following relational expression 1, more preferably satisfy the following relational expression 2, and even more preferably satisfy the following relational expression 3.

$$d \geq p \quad \text{(Relational Expression 1)}$$

$$d \geq 2p \quad \text{(Relational Expression 2)}$$

$$d \geq 4p \quad \text{(Relational Expression 3)}$$

(In the relational expressions above, d represents the thickness of the composite layer, and p represents the twisting pitch of the polymer network.)

Additionally, the thickness of the composite layer 300 and the twisting pitch of the liquid crystal component 320 when no voltage is applied preferably satisfy the following relational expression 4, more preferably satisfy the following relational expression 5, and even more preferably satisfy the following relational expression 6.

$$d \geq p \quad \text{(Relational Expression 4)}$$

$$d \geq 2p \quad \text{(Relational Expression 5)}$$

$$d \geq 4p \quad \text{(Relational Expression 6)}$$

(In the relational expressions above, d represents the thickness of the composite layer, and p represents the twisting pitch of the liquid crystal component when no voltage is applied.)

The photopolymerizable liquid crystal compound for forming the polymer network 310 is, for example, a compound that exhibits a liquid crystal phase at room temperature, is miscible with the liquid crystal component 320, and is phase-separated from the liquid crystal component 320 when a polymer is formed through curing by irradiation with ultraviolet light.

Examples of the photopolymerizable liquid crystal compound include monomers having: a substituent (hereinafter, also referred to as a mesogenic group) such as a biphenyl group, a terphenyl group, a naphthalene group, a phenyl benzoate group, an azobenzene group, and derivatives thereof; a photoreactive group such as a cinnamoyl group, a chalcone group, a cynnamylidene group, a β-(2-phenyl) acryloyl group, a cinnamate group, and derivatives thereof; and a polymerizable group such as an acrylate, a methacrylate, a maleimide, an N-phenylmaleimide, and a siloxane. The polymerizable group is preferably an acrylate. Furthermore, the number of polymerizable groups per molecule of the photopolymerizable liquid crystal compound is not particularly limited, but is preferably one or two.

The liquid crystal component 320 may be configured not containing a polymerizable group such as an acrylate, a methacrylate, a maleimide, an N-phenylmaleimide, or a siloxane.

In the present embodiment, the liquid crystal component 320 may have positive dielectric constant anisotropy ($\Delta\varepsilon$) as defined by the following equation, or may have negative dielectric constant anisotropy ($\Delta\varepsilon$), but preferably has positive dielectric constant anisotropy. The liquid crystal component having positive dielectric constant anisotropy is aligned in a direction parallel to the electric field direction, and the liquid crystal component having negative dielectric constant anisotropy is aligned in a direction perpendicular to the electric field direction. Note that the liquid crystal component having positive dielectric constant anisotropy is also referred to as a positive liquid crystal, and the liquid crystal component having negative dielectric constant anisotropy is also referred to as a negative liquid crystal. Furthermore, the major axis direction of the liquid crystal component is the direction of the slow axis.

$\Delta\varepsilon$=(Dielectric constant in major axis direction)−(Dielectric constant in minor axis direction)

As the liquid crystal component 320, for example, a tolan-based liquid crystal material (a liquid crystal material having a —C≡C— (carbon-carbon triple bond) as a linking group) can be used.

Preferably, the refractive index anisotropy $\Delta n$ of the liquid crystal component 320 is from 0.18 to 0.24, the dielectric constant anisotropy $\Delta\varepsilon$ of the liquid crystal component 320 is from 15 to 25, and a rotational viscosity $\gamma 1$ of the liquid crystal component 320 is from 100 mPa·s to 300 mPa·s. Through such an aspect, strong scattering and low voltage driving can be effectively achieved in a compatible manner, and a response speed comparable to a typical liquid crystal display device that does not contain a polymer network can be realized. Such an effect can be achieved by setting the refractive index anisotropy $\Delta n$, the dielectric constant anisotropy $\Delta\varepsilon$, and the rotational viscosity $\gamma 1$ of the liquid crystal component 320 all within the ranges described above.

Specific examples of the tolan-based liquid crystal material include liquid crystal materials having a structure represented by the following general formula (L1).

[Chemical Formula 1]

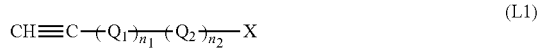
(L1)

(Wherein, $Q_1$ and $Q_2$ each independently represent an aromatic ring group, X represents a fluorine group or a cyano group, and $n_1$ and $n_2$ each independently represent 0 or 1.)

In general formula (L1) above, $n_1$ and $n_2$ are not simultaneously 0. That is, the sum of $n_1$ and $n_2$ is 1 or 2.

The aromatic ring group in general formula (L1) above may have a substituent.

In general formula (L1) above, preferably, $Q_1$ and $Q_2$ are each independently a structure of any of the following general formulas (L2-1) to (L2-7).

[Chemical Formula 2]

(L2-1)

(L2-2)

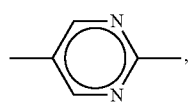
(L2-3)

(L2-4)

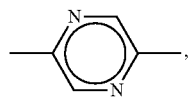
(L2-5)

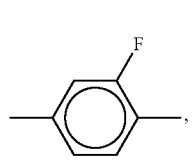
(L2-6)

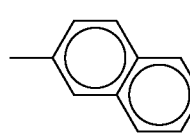
(L2-7)

Examples of specific structures of the liquid crystal material having a structure represented by the above general formula (L1) include the following structures.

[Chemical Formula 3]

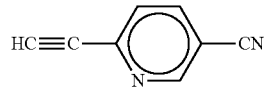

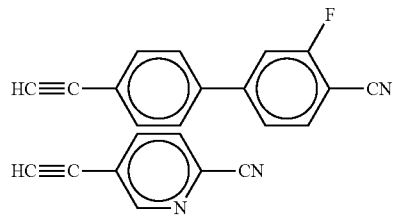

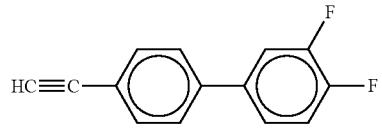

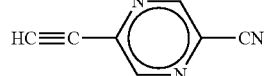

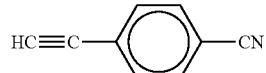

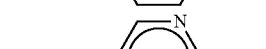

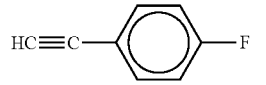

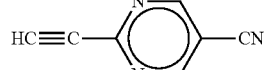

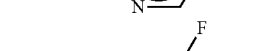

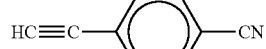

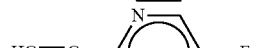

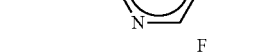

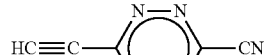

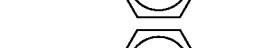

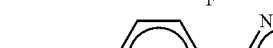

-continued

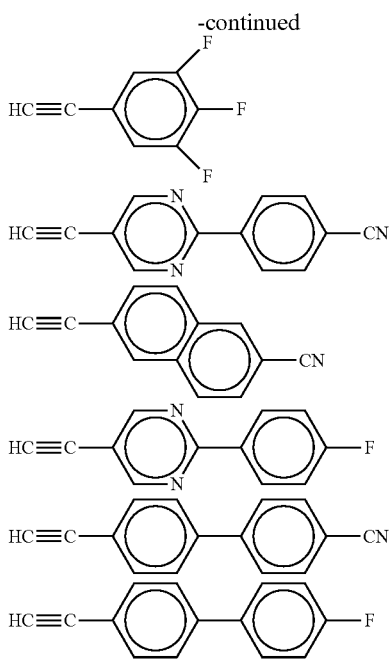

The weight ratio of the liquid crystal component 320 to the polymer network 310 (liquid crystal component:polymer network) is preferably from 90:10 to 97:3. In other words, preferably, the weight ratio of the liquid crystal component 320 is from 90 to 97, and when the weight ratio of the liquid crystal component 320 is 90 or greater, the weight ratio of the polymer network 310 is 10 or less, and when the weight ratio of the liquid crystal component 320 is 97 or less, the weight ratio of the polymer network 310 is 3 or greater. Through such an aspect, strong scattering and low voltage driving can be effectively achieved in a compatible manner. If the weight ratio of the polymer network 310 exceeds 10, strong scattering is obtained, but the drive voltage increases, and when the weight ratio of the polymer network 310 is less than 3, the drive voltage is suppressed, but strong scattering may not be achieved.

The first alignment film 41 and the second alignment film 42 are layers that have been subjected to an alignment treatment for controlling the alignment of the liquid crystal component 320 and the photopolymerizable liquid crystal compound, and an alignment film made of polyimide or the like that is commonly used in the field of liquid crystal display devices can be used. The first alignment film 41 and the second alignment film 42 may be rubbing alignment films that have been subjected to a rubbing treatment, or may be photo-alignment films that have been subjected to a photo-alignment treatment. In the following, the liquid crystal component 320 and the photopolymerizable liquid crystal compound may also be simply referred to as liquid crystal molecules.

The rubbing alignment film is obtained, for example, by depositing an alignment film material containing a polymer for a rubbing alignment film on a substrate to form a film, rotating a roller on which is wound a fabric made of rayon, cotton, or the like while maintaining a constant rotational speed and a constant distance between the roller and the substrate, and rubbing the surface of the film containing the polymer for the rubbing alignment film in a predetermined direction (rubbing method).

An example of the polymer for a rubbing alignment film is a polyimide. The polymer for the rubbing alignment film contained in the rubbing alignment film may be one type, or may be two or more types.

The photo-alignment film is obtained, for example, by depositing, on a substrate, an alignment film material containing a photo-alignment polymer having a photo-functional group to form a film, and irradiating the film with polarized ultraviolet light to generate anisotropy in the surface of the film containing the photo-alignment polymer (photo-alignment method).

Examples of the photo-alignment polymer include photo-alignment polymers having at least one photo-functional group selected from a cyclobutane group, an azobenzene group, a chalcone group, a cinnamate group, a coumarin group, a stilbene group, a phenol ester group, and a phenyl benzoate group. The photo-alignment polymer contained in the photo-alignment film may be one type, or may be two or more types. The photo-functional group of the photo-alignment polymer may be present on the main chain of the polymer, on a side chain of the polymer, or on both the main chain and a side chain of the polymer.

The type of photoreaction of the photo-alignment polymer is not particularly limited, and suitable examples of photo-alignment polymers include photolytic polymers, photo-rearrangement polymers (preferably photo-Fires rearrangement polymers), photo-isomerization polymers, photo-dimerization polymers and photo-crosslinked polymers. Any one of these may be used alone, or two or more types can be used in combination. Among these, from the perspective of alignment stability, a photolytic polymer having a reaction wavelength (main sensitivity wavelength) near 254 nm is particularly preferable. Photo-isomerization and photo-dimerization polymers having a photo-functional group on a side chain are also preferable.

The main chain structure of the photo-alignment polymer is not particularly limited, and examples of suitable structures include a polyamic acid structure, a polyimide structure, a poly(meth)acrylic acid structure, a polysiloxane structure, a polyethylene structure, a polystyrene structure, and a polyvinyl structure.

The first alignment film 41 and the second alignment film 42 are horizontal alignment films in which the liquid crystal component 320 is aligned in parallel to the surfaces of the alignment films, or are vertical alignment films in which the liquid crystal component 320 is aligned so as to be perpendicular to the surfaces of the alignment films. The first alignment film 41 and the second alignment film 42 are preferably horizontal alignment films. Through such an aspect, strong scattering and low voltage driving can be effectively achieved in a compatible manner. More preferably, the first alignment film 41 and the second alignment film 42 are horizontal alignment films, and the liquid crystal component 320 has positive dielectric constant anisotropy. Through such an aspect, strong scattering and low voltage driving can be more effectively achieved in a compatible manner.

In a case in which the first alignment film 41 and the second alignment film 42 are vertical alignment films, when the voltage applied to the composite layer 300 is less than the threshold voltage (including no voltage application), the alignment of the liquid crystal component is controlled mainly by the function of the first alignment film 41 and the second alignment film 42 such that the major axis of the liquid crystal component 320 is oriented in the horizontal direction relative to the first alignment film 41 and the second alignment film 42.

In other words, the liquid crystal component 320 is aligned horizontally with respect to the TFT substrate 100 when no voltage is applied, and the transmission amount of light transmitted through the composite layer 300 can be controlled by changing the alignment of the liquid crystal component 320 in accordance with the electric field generated in the composite layer 300 due to the voltage applied between the pixel electrode 120 and the common electrode 220. The liquid crystal component 320 is horizontally aligned by a regulating force of the first alignment film 41 and the second alignment film 42 when no voltage is applied between the pixel electrode 120 and the common electrode 220, and rotates in accordance with a vertical electric field generated in the composite layer 300 when a voltage is applied between the pixel electrode 120 and the common electrode 220.

Here, the matter of the major axis of the liquid crystal component 320 being oriented in the horizontal direction relative to the first alignment film 41 and the second alignment film 42 means that a tilt angle (including a pre-tilt angle) of the liquid crystal component 320 is from 0 to 5° with respect to the first alignment film 41 and the second alignment film 42, and the tilt angle is preferably from 0 to 3° and more preferably from 0 to 1°. The tilt angle of the liquid crystal component 320 refers to an angle at which the major axis (optical axis) of the liquid crystal component 320 is inclined with respect to the surfaces of the first alignment film 41 and the second alignment film 42.

In a case in which the first alignment film 41 and the second alignment film 42 are vertical alignment films, when the voltage applied to the composite layer 300 is less than the threshold voltage (including no voltage application), the alignment of the liquid crystal molecules is controlled mainly by the function of the first alignment film 41 and the second alignment film 42 such that the major axis of the liquid crystal molecules is oriented in the perpendicular direction relative to the first alignment film 41 and the second alignment film 42.

In other words, the liquid crystal component 320 is aligned perpendicularly with respect to the TFT substrate 100 when no voltage is applied, and the transmission amount of light transmitted through the composite layer 300 can be controlled by changing the alignment of the liquid crystal component 320 in accordance with the electric field generated in the composite layer 300 due to the voltage applied between the pixel electrode 120 and the common electrode 220. The liquid crystal component 320 is perpendicularly aligned by a regulating force of the first alignment film 41 and the second alignment film 42 when no voltage is applied between the pixel electrode 120 and the common electrode 220, and rotates in accordance with a vertical electric field generated in the composite layer 300 when a voltage is applied between the pixel electrode 120 and the common electrode 220.

Here, the matter of the major axis of the liquid crystal component 320 being oriented in the perpendicular direction relative to the first alignment film 41 and the second alignment film 42 means that a tilt angle (including a pre-tilt angle) of the liquid crystal component 320 is from 86 to 90° with respect to the first alignment film 41 and the second alignment film 42, and the tilt angle is preferably from 87 to 89° and more preferably from 87.5 to 89°.

In the present embodiment, the first alignment film 41 and the second alignment film 42 are provided between the TFT substrate 100 and the composite layer 300, and also between the counter substrate 200 and the composite layer 300, respectively. However, it is sufficient that the alignment films be provided between the composite layer 300 and at least one substrate selected from the TFT substrate 100 and the counter substrate 200. For example, the polymer dispersed liquid crystal display device 1 may include only the first alignment film 41 or the second alignment film 42. For example, when the polymer dispersed liquid crystal display device 1 has only the first alignment film 41 or the second alignment film 42, and the alignment film is a horizontal alignment film, if the other substrate side is slippery (zero anchoring), the liquid crystal component 320 assumes a twisted horizontal alignment state, and as a result, the same alignment state as in the case in which a horizontal alignment film is provided on the substrates of both sides can be achieved.

The backlight 50 is not particularly limited as long as it emits light to the liquid crystal panel 10P. An edge-type backlight, for example, can be used as the backlight 50. Use of an edge-type backlight 50 enables a display in which the back surface side of the liquid crystal panel 10P appears to be transparent, and thus the polymer dispersed liquid crystal display device 1 can be used as a see-through display. In addition, the liquid crystal panel 10P may be installed in a see-through display box, and a light source may be turned on from the side with respect to the liquid crystal panel 10P. Light from the light source diffuses and is reflected within the see-through display box, and the light source acts as the backlight 50. Through such an aspect, a display can be implemented in which the back surface side of the liquid crystal panel 10P appears to be transparent, and the polymer dispersed liquid crystal display device 1 can be used as a see-through display.

In addition to the liquid crystal panel 10P and the backlight 50, the polymer dispersed liquid crystal display device 1 of the present embodiment is constituted of a plurality of members such as: an external circuit such as a tape-carrier package (TCP) and a printed circuit board (PCB); an optical film such as a viewing angle increasing film and a luminance improving film; and a bezel (frame), and depending on the members, the members may be incorporated into another member. Members other than those described above are not particularly limited to specific members and, because such members can be those commonly used in the field of liquid crystal display devices, descriptions thereof are omitted.

Next, a method for manufacturing the polymer dispersed liquid crystal display device 1 of the present embodiment is described. The method for manufacturing the polymer dispersed liquid crystal display device 1 includes: an alignment film forming step of forming the first alignment film 41 and the second alignment film 42 subjected to an alignment treatment on one surface of the TFT substrate 100 and one surface of the counter substrate 200, respectively; an injection step of disposing the TFT substrate 100 and the counter substrate 200 facing each other with the first alignment film 41 and the second alignment film 42 oriented inward, and injecting a composition containing the liquid crystal component 320, the photopolymerizable liquid crystal compound, a polymerization initiator, and a chiral agent between the TFT substrate 100 and the counter substrate 200; and a light irradiation step of irradiating the composition with light to form a polymer network 310 while the photopolymerizable liquid crystal compound is cured.

The TFT substrate 100 and the counter substrate 200 can be fabricated by methods commonly used in the field of liquid crystal display devices.

In the above-described alignment film forming step, an alignment film material is applied to each of the TFT substrate 100 and the counter substrate 200 to form the first alignment film 41 and the second alignment film 42. Examples of the method of applying the alignment film material include application methods such as an ink-jet method and a roll coater method. Next, the first alignment film 41 and the second alignment film 42 are subjected to an alignment treatment. Examples of the alignment treatment include a rubbing treatment in which the alignment film surface is rubbed with a roller or the like, and a photo-alignment treatment in which the alignment film surface is irradiated with light. According to the photo-alignment treatment, the alignment treatment can be implemented without contacting the surface of the alignment film, and therefore unlike the rubbing treatment, a merit is provided of being able to suppress the generation of dirtiness, waste, and the like during the alignment treatment. An alignment film that is alignment treated through the photo-alignment treatment is also referred to as a photo-alignment film.

The first alignment film 41 and the second alignment film 42 may be subjected to a rubbing treatment so as to be aligned in a mutually anti-parallel manner (anti-parallel alignment), or may be subjected to a rubbing treatment so as to be aligned in a mutually parallel manner (parallel alignment).

In the injection step described above, the TFT substrate 100 and the counter substrate 200 are disposed facing each other with the first alignment film 41 and the second alignment film 42 oriented inward, and a composition containing the liquid crystal component 320, a photopolymerizable liquid crystal compound, a polymerization initiator, and a chiral agent is injected between the TFT substrate 100 and the counter substrate 200. In the injection step, the liquid crystal molecules on the first alignment film 41 side are aligned along the alignment treatment direction of the first alignment film 41, the liquid crystal molecules on the second alignment film 42 side are aligned along the alignment treatment direction of the second alignment film 42, and the alignment direction of liquid crystal molecules located between the first alignment film 41 and the second alignment film 42 is continuously changed between the first alignment film 41 and the second alignment film 42.

The polymerization initiator is not particularly limited, and a known polymerization initiator can be used. Examples of the polymerization initiator that can be used include Omnirad 184 (trade name, available from IGM Resins B.V.) represented by the following chemical formula (IN1) and OXE03 (available from BASF SE) represented by the following chemical formula (IN2).

[Chemical Formula 4]

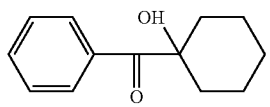

(IN1)

[Chemical Formula 5]

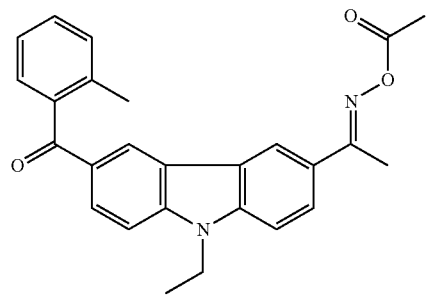

(IN2)

The chiral agent is not particularly limited, and a known chiral agent can be used. Examples of the chiral agent include CM-51L (available from JNC Corporation) and S-811 (available from Merck & Co., Inc.) represented by the following chemical formula (C1).

[Chemical Formula 6]

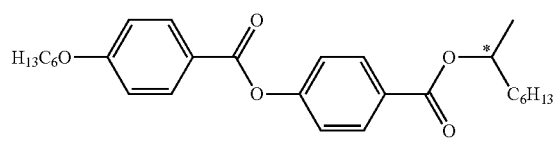

(C1)

The weight ratio of the liquid crystal component 320 to the photopolymerizable liquid crystal compound in the composition is preferably from 90:10 to 97:3. In other words, preferably, the weight ratio of the liquid crystal component 320 is from 90 to 97, and when the weight ratio of the liquid crystal component 320 is 90 or greater, the weight ratio of the photopolymerizable liquid crystal compound is 10 or less, and when the weight ratio of the liquid crystal component 320 is 97 or less, the weight ratio of the photopolymerizable liquid crystal compound is 3 or greater. Through such an aspect, strong scattering and low voltage driving can be effectively achieved in a compatible manner. When the weight ratio of the photopolymerizable liquid crystal compound exceeds 10, strong scattering is obtained, but the drive voltage increases, and when the weight ratio of the photopolymerizable liquid crystal compound is less than 3, the drive voltage is suppressed, but strong scattering may not be obtained.

When the helical twisting power of the chiral agent contained in the composition is from 9 [1/µm] to 12 [1/µm], preferably, the weight ratio of the liquid crystal component 320 to the entire composition is from 92 wt. % to 95 wt. %, the weight ratio of the photopolymerizable liquid crystal compound is from 1 wt. % to 7 wt. %, the weight ratio of the chiral agent is from 0.1 wt. % to 6 wt. %, and the weight ratio of the polymerization initiator is from 0.1 wt. % to 2 wt. %.

In the light irradiation step, the polymer network 310 is formed by irradiating the composition with light while curing the photopolymerizable liquid crystal compound. Here, when the liquid crystal molecules are aligned in the injection step described above, the photopolymerizable liquid crystal compound is in a liquid crystal phase. However, in the light irradiation step, the composition is irradiated with light, and the photopolymerizable liquid crystal compound is cured through a photo polymerization reaction.

Thereby, the photopolymerizable liquid crystal compound is solidified with the alignment state thereof being maintained, and the polymer network 310 is formed, resulting in a failure of electric field response. Thus, the alignment direction of the polymer network 310 constituted of the cured product of the photopolymerizable liquid crystal compound is not aligned with the electric field direction even when a voltage is applied thereafter. On the other hand, the alignment state of the liquid crystal component 320 is not fixed, and therefore the alignment direction is aligned with the electric field direction when a voltage is applied. The number of turns in the helical structure of the polymer network 310 can be adjusted, for example, by changing the concentration of the chiral agent.

Accordingly, when no voltage is applied, the alignment directions of the polymer network 310 and the liquid crystal component 320 are in a state of matching the direction parallel to the TFT substrate 100 and the counter substrate 200. In this state, the refractive indexes of the polymer network 310 and the liquid crystal component 320 are matched, and thereby the polymer dispersed liquid crystal display device 1 is in a transparent state. In addition, when a power supply is connected between the pixel electrode 120 and the common electrode 220 and a voltage is applied to the composite layer 300, the alignment direction of the liquid crystal component 320 is aligned with the electric field direction. Therefore, a light scattering state is caused by the mismatching of the refractive indexes at the interface between the liquid crystal component 320 and the polymer network 310, and the polymer dispersed liquid crystal display device 1 becomes cloudy (scattering state).

The type of the light used in the light irradiation step is not particularly limited, and for example, ultraviolet light can be used. Examples of the ultraviolet light include light having a peak wavelength in a wavelength band of from 340 nm to 390 nm.

In the light irradiation step, the composition is preferably irradiated with light having an illuminance of from 5 mW/cm² to 50 mW/cm². When the illuminance is set to 5 mW/cm² or higher, more sufficient scattering can be obtained, and when the illuminance is set to 50 mW/cm² or less, increases in temperature during irradiation can be suppressed, and deterioration in production yield and variations in characteristics can be suppressed.

In the aforementioned light irradiation step, the composition is preferably irradiated with light having an irradiation dose from 0.5 J/cm² to 5 J/cm². When the irradiation dose is set to 0.5 J/cm² or higher, the polymerization reaction of the photopolymerizable liquid crystal compound can be sufficiently promoted, an amount of unreacted photopolymerizable liquid crystal compound can be reduced, and the polymer network 310 can be formed. As a result, the hysteresis and baking characteristics of the polymer dispersed liquid crystal display device 1 can be improved. Furthermore, production tact time can be improved by setting the irradiation dose to 5 J/cm² or less.

The disclosure is described in further detail below using examples and comparative examples, but the disclosure is not limited to these examples alone.

Example 1

A reverse-type polymer dispersed liquid crystal display device 1 of Example 1 having the same configuration as the embodiment illustrated in FIG. 1 was fabricated. In Example 1, a TFT substrate 100 including a pixel electrode 120 constituted of ITO, and a counter substrate 200 including a common electrode 220 constituted of ITO were prepared. A film was formed from an alignment film material containing polyimide on each of the TFT substrate 100 and the counter substrate 200 and was subjected to a rubbing treatment so as to be anti-parallel, and thereby a first alignment film 41, which is a horizontal alignment film, was formed on the TFT substrate 100, and a second alignment film 42, which is a horizontal alignment film, was formed on the counter substrate 200.

Next, the TFT substrate 100 and the counter substrate 200 were disposed facing each other with the first alignment film 41 and the second alignment film 42 oriented inward, and a composition containing a positive liquid crystal component 320, a photopolymerizable liquid crystal compound, a polymerization initiator, and a chiral agent was injected between the TFT substrate 100 and the counter substrate 200.

As the liquid crystal component 320, a tolan-based liquid crystal material for which $\Delta n$ was in a range of from 0.18 to 0.24, $\Delta \varepsilon$ was in a range of from 15 to 25, and the rotational viscosity $\gamma 1$ was in a range of from 100 to 300 mPa·s was used. As the photopolymerizable liquid crystal compound, a monomer having a mesogenic group, a photoreactive group, and an acrylate group was used. As the polymerization initiator, OXE03 (available from BASF SE) was used. CM-51L (available from JNC Corporation) was used as the chiral agent. The helical casting power (HTP) of the chiral agent was 10.8 [1/μm]. Here, the definition of HTP=1/pC (p: twisting pitch, C: concentration of chiral agent) means that for a case in which HTP is 10 [1/μm], the chiral agent has a function of causing a helical structure that is wound once every 10 μm (a helical structure twisting 360° every 10 μm) through the addition of 1 wt. %. The weight ratio with respect to the composition was 93.6 wt. % (95 parts by weight) for the positive liquid crystal component 320, 4.93 wt. % (5 parts by weight) for the photopolymerizable liquid crystal compound, 0.493 wt. % (0.5 parts by weight) for the polymerization initiator, and 0.990 wt. % (1 part by weight) for the chiral agent.

Next, the composition described above was irradiated with ultraviolet light having a main wavelength of 365 nm (ultraviolet light with a peak wavelength of 365 nm) at an illuminance of 5 mW/cm² and an irradiation dose of 2 J/cm² to cure (polymerize) the photopolymerizable liquid crystal compound, thereby forming a composite layer 300 including the liquid crystal component 320 and a polymer network 310. The thickness of the composite layer 300 was 10 μm. When the liquid crystal component 320 was twisted by the chiral agent, the photopolymerizable liquid crystal compound likewise twisted in the same manner (at the same pitch). Thus, after UV irradiation, a polymer network 310 having a helical structure with one turn in the composite layer 300 (having an alignment structure twisted by 360° in the composite layer 300) was formed. In addition, when no voltage was applied, the liquid crystal component 320 had a helical structure with one turn (alignment structure twisted by 360°) in the composite layer 300.

In the transparent state (when no voltage was applied) of the polymer dispersed liquid crystal display device of Example 1 illustrated in FIG. 1, the liquid crystal component 320 and the polymer network 310 were twisted at the same pitch. As a result, matching of the extraordinary and ordinary refractive indexes (ne, no) between the liquid crystal component 320 and the polymer network 310 was achieved, and thus the composite layer 300 was able to function in a transparent state.

On the other hand, application of a voltage to the pixel electrode 120 and the common electrode 220 caused the liquid crystal component 320 to rise, resulting in mismatching of the extraordinary and ordinary refractive indexes (ne, no) between the liquid crystal component 320 and the polymer network 310, and when unpolarized light was incident thereon, the light scattered without dependence on the polarized light, and therefore it was possible to achieve a scattering state. At this time, it is thought that when the twisting pitch of the polymer network 310 is large (when the number of twist rotations is large), the extraordinary and ordinary refractive indexes (ne, no) between the liquid crystal component 320 and the polymer network 310 are effectively mismatched with respect to the thickness direction of the composite layer 300, and therefore scattering is strengthened.

Example 2

Figure 3:
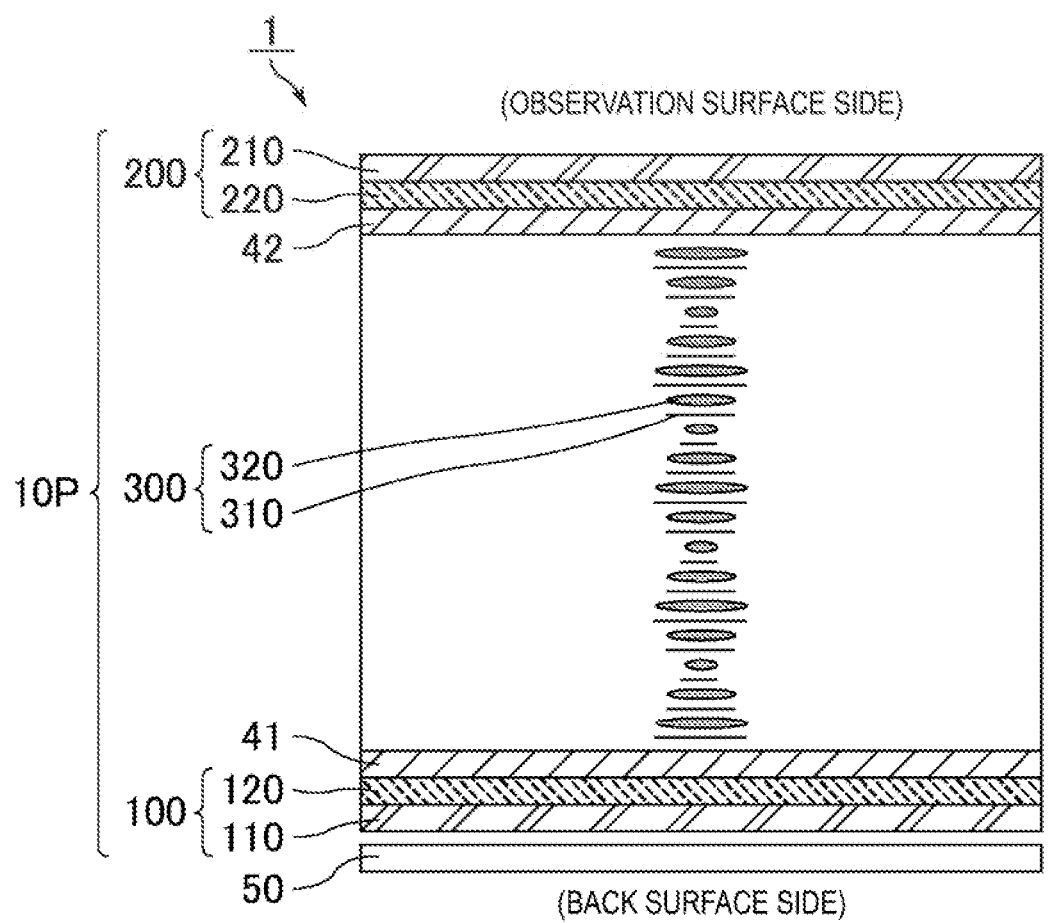
FIG. 3 is a schematic cross-sectional view of a polymer dispersed liquid crystal display device of Example 2.

FIG. 3 is a schematic cross-sectional view of the polymer dispersed liquid crystal display device of Example 2. The polymer dispersed liquid crystal display device 1 of Example 2 illustrated in FIG. 3 was fabricated. The polymer dispersed liquid crystal display device of Example 2 was fabricated in the same manner as in Example 1 with the exception that the amount of chiral agent added to the composition was changed to 2 parts by weight. In Example 2, a polymer network 310 having a helical structure with two turns in the composite layer 300 (having an alignment structure twisted by 720° in the composite layer 300) was formed. In addition, when no voltage was applied, the liquid crystal component 320 had a helical structure with two turns (alignment structure twisted by 720°) in the composite layer 300.

Example 3

Figure 4:
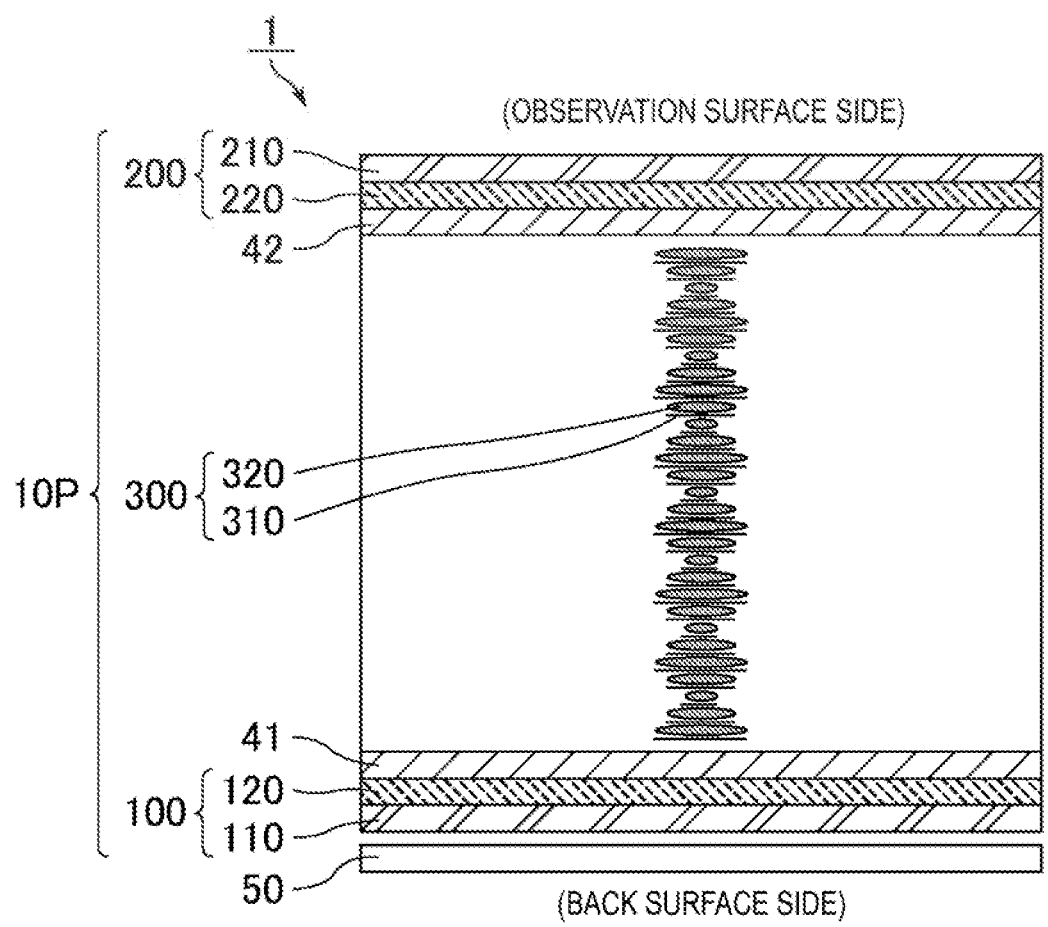
FIG. 4 is a schematic cross-sectional view of a polymer dispersed liquid crystal display device of Example 3.

FIG. 4 is a schematic cross-sectional view of a polymer dispersed liquid crystal display device according to Example 3. The polymer dispersed liquid crystal display device 1 of Example 3 illustrated in FIG. 4 was fabricated. The polymer dispersed liquid crystal display device of Example 3 was fabricated in the same manner as in Example 1 with the exception that the amount of chiral agent added to the composition was changed to 4 parts by weight. In Example 3, a polymer network 310 having a helical structure with four turns in the composite layer 300 (having an alignment structure twisted by 1440° in the composite layer 300) was formed. In addition, when no voltage was applied, the liquid crystal component 320 had a helical structure with four turns (alignment structure twisted by 1440°) in the composite layer 300.

Comparative Example 1

Figure 5:
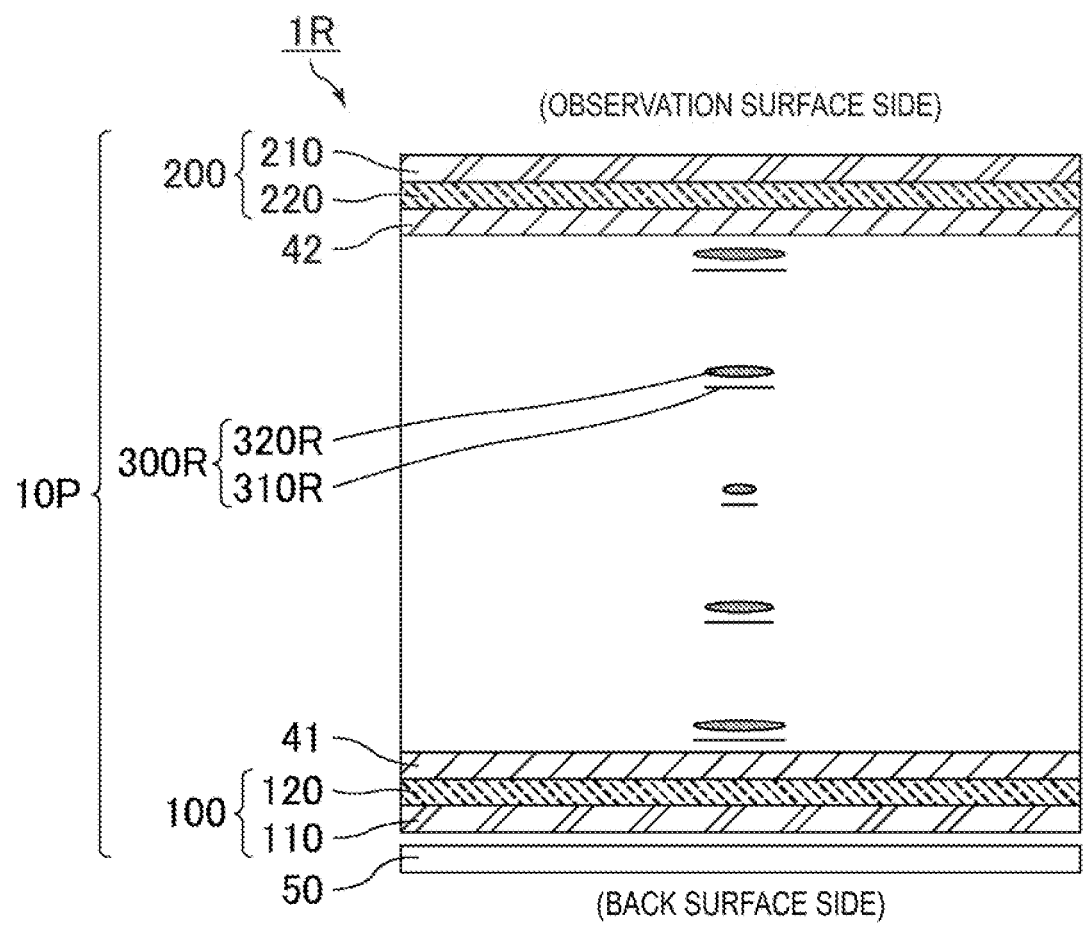
FIG. 5 is a schematic cross-sectional view of a polymer dispersed liquid crystal display device of Comparative Example 1.

FIG. 5 is a schematic cross-sectional view of a polymer dispersed liquid crystal display device according to Comparative Example 1. The polymer dispersed liquid crystal display device 1R of Comparative Example 1 illustrated in FIG. 5 was fabricated. The polymer dispersed liquid crystal display device 1R of Comparative Example 1 was fabricated in the same manner as in Example 1 with the exception that the amount of chiral agent added to the composition was changed to 0.5 parts by weight. In Comparative Example 1, a polymer network 310R having a helical structure with 0.5 turns in the composite layer 300R (having an alignment structure twisted by 180° in the composite layer 300R) was formed. In addition, when no voltage was applied, the liquid crystal component 320R had a helical structure with 0.5 turns (alignment structure twisted by 180°) in the composite layer 300R.

Evaluation of Polymer Dispersed Liquid Crystal Display Devices of Examples 1 to 3 and Comparative Example 1

Figure 6:
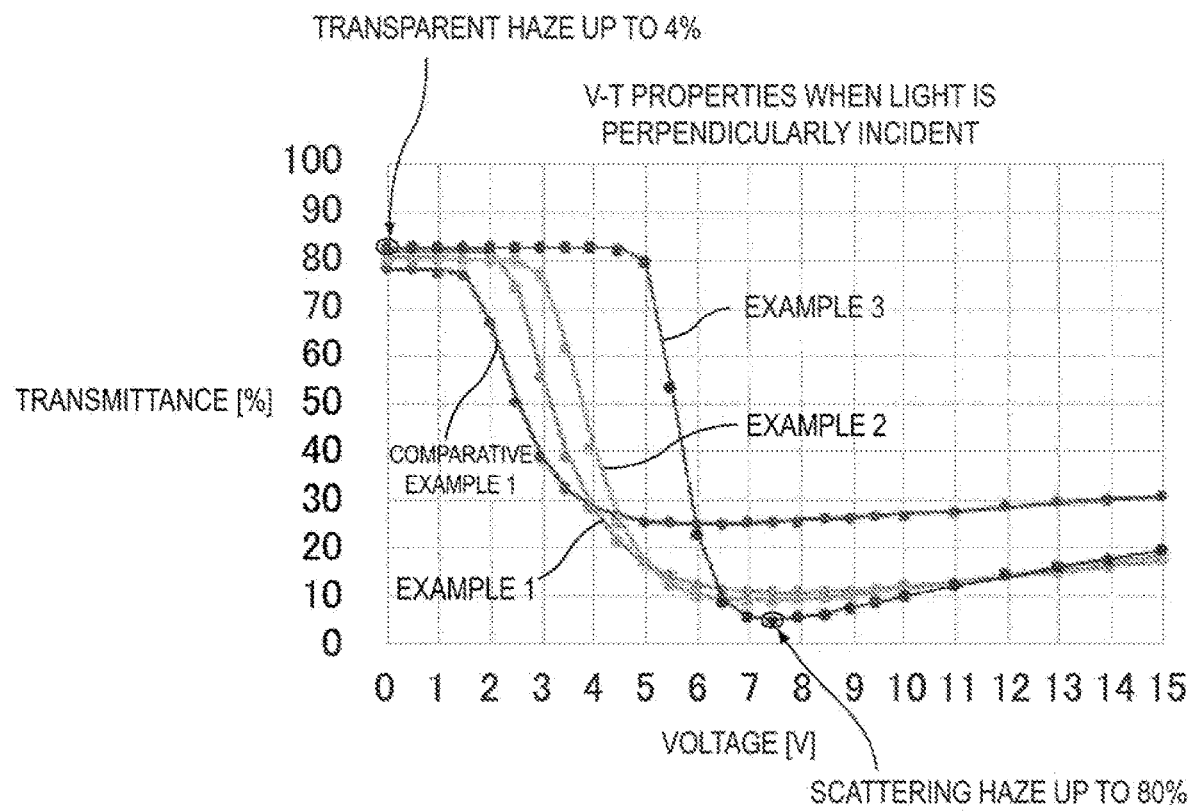
FIG. 6 is a graph showing the transmittance with respect to the drive voltage of the polymer dispersed liquid crystal display devices of Examples 1 to 3 and Comparative Example 1.

The transmittance with respect to the drive voltage was measured for each of the polymer dispersed liquid crystal display devices 1 of Examples 1 to 3 and for the polymer dispersed liquid crystal display device 1R of Comparative Example 1. The results are shown in FIG. 6. FIG. 6 is a graph showing the transmittance with respect to the drive voltage of the polymer dispersed liquid crystal display devices of Examples 1 to 3 and Comparative Example 1.

As illustrated in FIG. 6, with the polymer dispersed liquid crystal display devices 1 of Examples 1 to 3, reverse-type polymer dispersed liquid crystal display devices that can be driven with a general purpose driver (drive voltage of 10 V or less) were successfully realized.

Specifically, as illustrated in FIG. 6, in Example 1, when functioning in a scattering state (when a voltage was applied), the polymer dispersed liquid crystal display device successfully exhibited low transmittance (strong scattering) of approximately 10% at a low drive voltage (approximately 7.5 V). On the other hand, when the polymer dispersed liquid crystal display device functioned in a transparent state (when no voltage was applied), a transmittance of 80% or greater was obtained, and it was confirmed that high transmittance was exhibited.

Similarly, in Example 2, when functioning in a scattering state (when a voltage was applied), the polymer dispersed liquid crystal display device successfully exhibited low transmittance (strong scattering) of approximately 9% at a low drive voltage (approximately 7.5 V). On the other hand, when the polymer dispersed liquid crystal display device functioned in a transparent state (when no voltage was applied), a transmittance of 80% or greater was obtained, and it was confirmed that high transmittance was exhibited.

Similarly, in Example 3, when functioning in a scattering state (when a voltage was applied), the polymer dispersed liquid crystal display device exhibited low transmittance (strong scattering) of approximately 5% at a low drive voltage (approximately 7.5 V). On the other hand, when the polymer dispersed liquid crystal display device functioned in a transparent state (when no voltage was applied), a transmittance of 80% or greater was obtained, and it was confirmed that high transmittance was exhibited. In Example 3, a large contrast of approximately 15 was obtained, and it was possible to achieve a higher contrast than that of the polymer dispersed liquid crystal display device disclosed in JP 11-95195 A, which has a contrast ratio of approximately 10.

On the other hand, in Comparative Example 1, when functioning in a scattering state (when a voltage is applied), the polymer dispersed liquid crystal display exhibited a transmittance of from 20 to 30%, which is high, and strong scattering could not be achieved.

Example 4

A polymer dispersed liquid crystal display device of Example 4 was fabricated in the same manner as in Example 1 with the exception that the amount of chiral agent added to the composition was changed to 0.5 parts by weight, the thickness of the composite layer was 20 µm, and the composition was irradiated with ultraviolet light having a main wavelength of 365 nm (ultraviolet light having a peak wavelength of 365 nm) at an irradiation dose of 500 mJ/cm². In Example 4, a polymer network 310 having a helical structure with one turn in the composite layer 300 (having an alignment structure twisted by 360° in the composite layer 300) was formed. In addition, when no voltage was applied, the liquid crystal component 320 had a helical structure with one turn (alignment structure twisted by 360°) in the composite layer 300.

Example 5

A polymer dispersed liquid crystal display device of Example 5 was fabricated in the same manner as in Example 1 with the exception that the amount of chiral agent added to the composition was changed to 2 parts by weight, the thickness of the composite layer was 20 µm, and the composition was irradiated with ultraviolet light having a main wavelength of 365 nm (ultraviolet light having a peak wavelength of 365 nm) at an irradiation dose of 500 mJ/cm². In Example 5, a polymer network 310 having a helical structure with four turns in the composite layer 300 (having an alignment structure twisted by 1440° in the composite layer 300) was formed. In addition, when no voltage was applied, the liquid crystal component 320 had a helical structure with four turns (alignment structure twisted by 1440°) in the composite layer 300.

Comparative Example 2

A polymer dispersed liquid crystal display device of Comparative Example 2 was fabricated in the same manner as in Example 1 with the exception that the amount of chiral agent added to the composition was changed to 4 parts by weight, the thickness of the composite layer was 20 µm, and the composition was irradiated with ultraviolet light having a main wavelength of 365 nm (ultraviolet light having a peak wavelength of 365 nm) at an irradiation dose of 500 mJ/cm². In Comparative Example 2, a polymer network having a helical structure with eight turns in the composite layer (having an alignment structure twisted by 2880° in the composite layer) was formed. In addition, when no voltage was applied, the liquid crystal component had a helical structure with eight turns (an alignment structure twisted by 2880°) in the composite layer.

Comparative Example 3

A polymer dispersed liquid crystal display device of Comparative Example 3 was fabricated in the same manner as in Example 1 with the exception that the amount of chiral agent added to the composition was changed to 8 parts by weight, the thickness of the composite layer was 20 µm, and the composition was irradiated with ultraviolet light having a main wavelength of 365 nm (ultraviolet light having a peak wavelength of 365 nm) at an irradiation dose of 500 mJ/cm². In Comparative Example 3, a polymer network having a helical structure with 16 turns in the composite layer (having an alignment structure twisted by 5760° in the composite layer) was formed. In addition, when no voltage was applied, the liquid crystal component had a helical structure with 16 turns (an alignment structure twisted by 5760°) in the composite layer.

Comparative Example 4

A polymer dispersed liquid crystal display device of Comparative Example 4 was fabricated in the same manner as in Example 1 with the exception that the amount of chiral agent added to the composition was changed to 16 parts by weight, the thickness of the composite layer was 20 µm, and the composition was irradiated with ultraviolet light having a main wavelength of 365 nm (ultraviolet light having a peak wavelength of 365 nm) at an irradiation dose of 500 mJ/cm². In Comparative Example 4, a polymer network having a helical structure with 32 turns in the composite layer (having an alignment structure twisted by 11520° in the composite layer) was formed. In addition, when no voltage was applied, the liquid crystal component had a helical structure with 32 turns (an alignment structure twisted by 11520°) in the composite layer.

Evaluation of Polymer Dispersed Liquid Crystal Display Devices of Examples 4 and 5 and Comparative Examples 2 to 4

Figure 7:
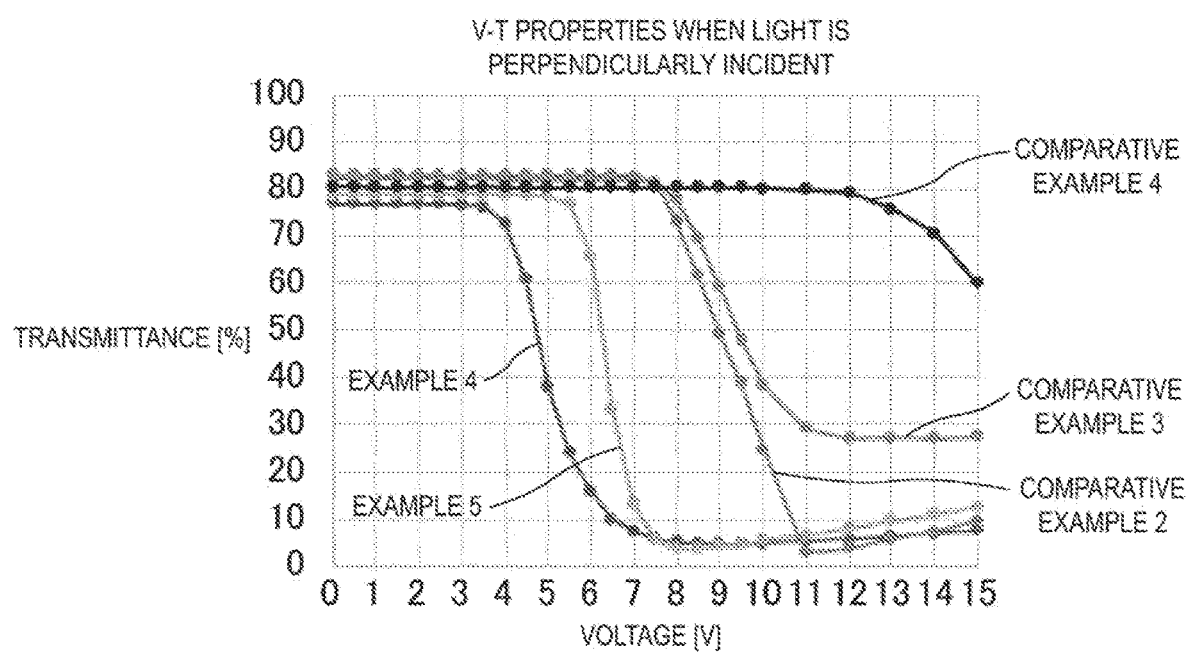
FIG. 7 is a graph showing the transmittance with respect to the drive voltage of polymer dispersed liquid crystal display devices of Examples 4 and 5 and Comparative Examples 2 to 4.

The transmittance with respect to the drive voltage was measured for each of the polymer dispersed liquid crystal display devices of Examples 4 and 5 and Comparative Examples 2 to 4. The results are shown in FIG. 7. FIG. 7 is a graph showing the transmittance with respect to the drive voltage of polymer dispersed liquid crystal display devices of Examples 4 and 5 and Comparative Examples 2 to 4.

As illustrated in FIG. 7, with the polymer dispersed liquid crystal display devices of Examples 4 and 5, reverse-type polymer dispersed liquid crystal display devices that can be driven with a general purpose driver (drive voltage of 10 V or less) were successfully realized.

Specifically, as illustrated in FIG. 7, in Examples 4 and 5, when functioning as a scattering state (when a voltage is applied), the polymer dispersed liquid crystal display device successfully exhibited low transmittance (strong scattering) of approximately 10% at a low drive voltage of 10 V or less. On the other hand, when the polymer dispersed liquid crystal display device functioned in a transparent state (when no voltage was applied), a transmittance of approximately 80% was obtained, and it was confirmed that high transmittance was exhibited.

Meanwhile, as shown in Comparative Examples 2 to 4, it was confirmed that when the polymer network has a helical structure with 8 or more turns in the composite layer (the polymer network has an alignment structure twisted by 2880° or greater in the composite layer), the drive voltage was 10 V or greater, and a general purpose driver could not be used.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A polymer dispersed liquid crystal display device comprising:
   a pair of substrates including an electrode on at least one substrate; and
   a composite layer disposed between the pair of substrates, wherein
   the composite layer comprises a liquid crystal component and a polymer network constituted by a cured product of a photopolymerizable liquid crystal compound, and
   the composite layer is in a transparent state when no voltage is applied and in a scattering state when a voltage is applied, and the polymer network has a helical structure with a number of turns from one to less than eight in the composite layer.

2. The polymer dispersed liquid crystal display device according to claim 1,
wherein a thickness of the composite layer and a twisting pitch of the polymer network satisfy a relational expression 1:

$$d \geq p \quad \text{(Relational Expression 1)}$$

wherein, d represents the thickness of the composite layer, and p represents the twisting pitch of the polymer network.

3. The polymer dispersed liquid crystal display device according to claim 2,
wherein the thickness of the composite layer and the twisting pitch of the polymer network satisfy a relational expression 2:

$$d \geq 2p \quad \text{(Relational Expression 2)}$$

wherein, d represents the thickness of the composite layer, and p represents the twisting pitch of the polymer network.

4. The polymer dispersed liquid crystal display device according to claim 3,
wherein the thickness of the composite layer and the twisting pitch of the polymer network satisfy a relational expression 3:

$$d \geq 4p \quad \text{(Relational Expression 3)}$$

wherein, d represents the thickness of the composite layer, and p represents the twisting pitch of the polymer network.

5. The polymer dispersed liquid crystal display device according to claim 1,
wherein a refractive index anisotropy ($\Delta n$) of the liquid crystal component is from 0.18 to 0.24.

6. The polymer dispersed liquid crystal display device according to claim 1,
wherein a weight ratio of the liquid crystal component to the polymer network is from 90:10 to 97:3.

7. The polymer dispersed liquid crystal display device according to claim 1, further comprising
an alignment film between at least one substrate of the pair of substrates and the composite layer,
wherein the alignment film is a horizontal alignment film configured to align the liquid crystal component in parallel to a surface of the alignment film.

8. A method for manufacturing the polymer dispersed liquid crystal display device described in claim 1, the method comprising:
forming an alignment film subjected to an alignment treatment on one surface of each of the pair of substrates;
disposing the substrates of the pair of substrates facing each other with the alignment films oriented inward, and injecting a composition containing the liquid crystal component, the photopolymerizable liquid crystal compound, a polymerization initiator, and a chiral agent between the pair of substrates; and
irradiating the composition with light to form the polymer network while the photopolymerizable liquid crystal compound is cured.

9. The method for manufacturing a polymer dispersed liquid crystal display device according to claim 8,
wherein the composition is irradiated with light having an illuminance from 5 mW/cm$^2$ to 50 mW/cm$^2$.

10. The method for manufacturing a polymer dispersed liquid crystal display device according to claim 8,
wherein the composition is irradiated with light of an irradiation dose from 0.5 J/cm$^2$ to 5 J/cm$^2$.

11. The method for manufacturing a polymer dispersed liquid crystal display device according to claim 8,
wherein a weight ratio of the liquid crystal component to the photopolymerizable liquid crystal compound in the composition is from 90:10 to 97:3.

12. The method for manufacturing a polymer dispersed liquid crystal display device according to claim 8,
wherein the alignment film is a horizontal alignment film configured to align the liquid crystal component in parallel to a surface of the alignment film.

* * * * *